(12) United States Patent
Leone et al.

(10) Patent No.: US 8,347,836 B2
(45) Date of Patent: Jan. 8, 2013

(54) METHOD FOR CONTROLLING A VARIABLE EVENT VALVETRAIN

(75) Inventors: Thomas Leone, Ypsilanti, MI (US); Robert Stein, Saline, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 524 days.

(21) Appl. No.: 12/336,333

(22) Filed: Dec. 16, 2008

(65) Prior Publication Data

US 2009/0095244 A1 Apr. 16, 2009

Related U.S. Application Data

(63) Continuation of application No. 11/176,089, filed on Jul. 7, 2005, now Pat. No. 7,469,667.

(51) Int. Cl.
*F01L 1/34* (2006.01)

(52) U.S. Cl. .................................. 123/90.15; 123/90.16

(58) Field of Classification Search .............. 123/90.15, 123/90.16, 90.17, 90.31
See application file for complete search history.

(56) References Cited

U.S. PATENT DOCUMENTS

| | | | |
|---|---|---|---|
| 4,811,231 A | 3/1989 | Hataoka et al. | |
| 4,867,115 A * | 9/1989 | Henein | 123/179.17 |
| 4,964,318 A | 10/1990 | Ganoung | |
| 6,062,201 A * | 5/2000 | Nozawa et al. | 123/478 |
| 6,474,291 B2 | 11/2002 | Collins et al. | |
| 6,609,365 B2 | 8/2003 | Almkvist et al. | |
| 6,705,257 B2 | 3/2004 | Shimizu | |
| 6,837,040 B2 | 1/2005 | Sonoda et al. | |
| 6,850,831 B2 | 2/2005 | Buckland et al. | |
| 6,938,598 B1 | 9/2005 | Lewis et al. | |
| 7,011,075 B2 | 3/2006 | Lewis | |

(Continued)

FOREIGN PATENT DOCUMENTS

JP 02221649 9/1990

OTHER PUBLICATIONS

Flierl, R. et al., "The Third Generation of Valvetrains—New Fully Variable Valvetrains for Throttle-Free Load Control", SAE Technical Paper Series 2000-01-1227, SAE 2000 World Congress, Detroit, Michigan, Mar. 6-9, 2000.

(Continued)

*Primary Examiner* — Zelalem Eshete
(74) *Attorney, Agent, or Firm* — Julia Voutyras; Alleman Hall McCoy Russell & Tuttle LLP

(57) ABSTRACT

A method to start an internal combustion engine having a variable event valvetrain is provided. The method includes increasing the speed of said internal combustion engine during a start from a stopped position after a request to start said internal combustion engine. The method may further include increasing an intake valve lift amount, of at least a cylinder during said start while said internal combustion engine speed is increasing. The method may further include only enabling fuel flow to said cylinder when said intake valve lift amount reaches a predetermined level.

8 Claims, 8 Drawing Sheets

U.S. PATENT DOCUMENTS

| | | |
|---|---|---|
| 7,021,289 B2 | 4/2006 | Lewis et al. |
| 7,047,126 B2 | 5/2006 | Lewis |
| 7,055,483 B2 | 6/2006 | Lewis et al. |
| 7,194,993 B2 | 3/2007 | Lewis et al. |
| 7,383,820 B2 | 6/2008 | Lewis et al. |
| 2003/0101952 A1 | 6/2003 | Uehara et al. |
| 2003/0106515 A1 | 6/2003 | Kondo |
| 2004/0149251 A1 | 8/2004 | Nishikawa et al. |
| 2005/0066933 A1 | 3/2005 | Kaita et al. |
| 2005/0066934 A1 | 3/2005 | Kawamura |
| 2005/0193968 A1* | 9/2005 | Nohara et al. ............ 123/90.16 |
| 2005/0211227 A1 | 9/2005 | Mizutani |
| 2007/0276910 A1 | 11/2007 | Deboy et al. |

OTHER PUBLICATIONS

Van Nieuwstadt, M. J. et al., "Air Charge Estimation in Camless Engines", SAE Technical Paper Series 2001-01-0581, SAE 2001 World Congress, Detroit, Michigan, Mar. 5-8, 2001.

Jung, H. I-I, et al., "Comparison of Dual Retard VCT to Continuously Variable Event Valvetrain", SAE Technical Paper Series 2004-01-1268, SAE 2004 World Congress, Detroit, Michigan, Mar. 8-11, 2004.

Leone, T. G. et al., "Comparison of Variable Camshaft Timing Strategies at Part Load", SAE Technical Paper Series 960584, International Congress & Exposition, Detroit, Michigan, Feb. 26-29, 1996.

* cited by examiner

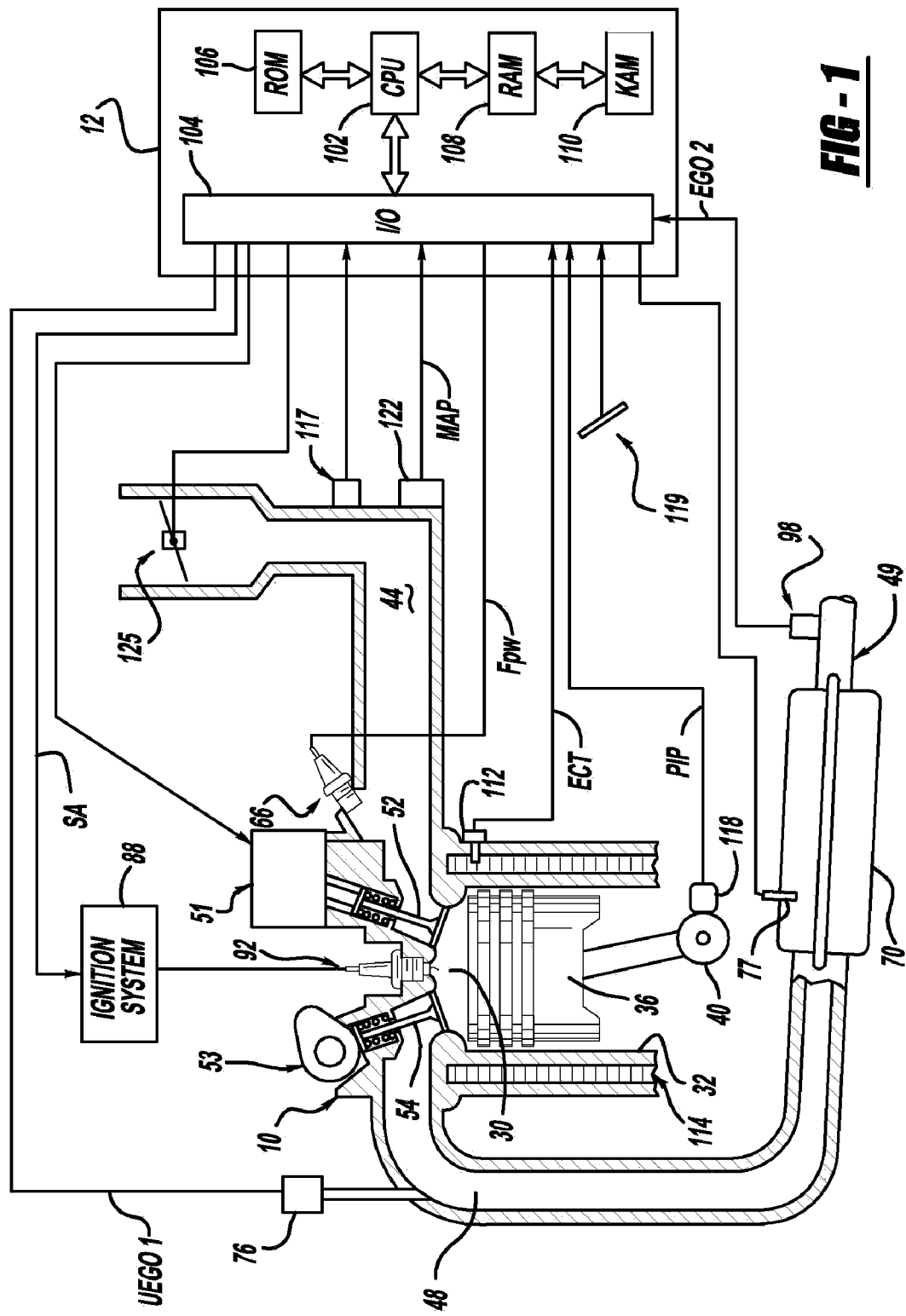

US 8,347,836 B2

METHOD FOR CONTROLLING A VARIABLE EVENT VALVETRAIN

CROSS REFERENCE TO PARENT APPLICATION

This present application is a continuation of U.S. application Ser. No. 11/176,089, filed Jul. 7, 2005, entitled "Method for Controlling a Variable Event Valvetrain", naming Thomas Leone and Robert Stein as inventors, the entire contents of which are incorporated herein by reference.

FIELD

The present description relates to a method for improving engine starting and stopping for an internal combustion engine having a variable event valvetrain. The method may be particularly useful for hybrid vehicles where there may be frequent engine starting and stopping.

BACKGROUND

One method to control intake and exhaust valve operation during engine operation is described in U.S. Patent Publication No. U.S. 2003/0106515. This method presents a means to operate a variable event valvetrain during vehicle starting and stopping. The method attempts to control valve operation after a request to stop or start the engine has been made.

During a stop sequence, the method reduces valve lift and fuel in an attempt to gradually reduce engine speed without disturbing the driver. By controlling the inducted air amount and the fuel amount, the method attempts to control engine torque so that the engine will decelerate to a stop in a more controlled manner.

The method also attempts to control engine starting by adjusting valve lift. In one embodiment the valve lift is moved to a desired amount just after an engine is stopped and then is held constant during a subsequent engine start. In a second embodiment valve lift is adjusted to a predetermined position just before a start and then is held constant during the start. These valve lift strategies attempt to provide a smooth start when an engine is automatically started.

In addition, the method also attempts to reduce engine emissions after an engine is stopped by setting the valve lift to a predetermined position.

The above-mentioned method can also have several disadvantages. Specifically, the method controls valve timing and fuel amount during engine stopping without regard to combustion stability. By not recognizing that combustion stability may be affected by reducing cylinder air amount, the method may produce misfires and increase engine emissions.

In addition, vehicle emissions may be higher than desired during an engine start since the above-mentioned methods may allow oxygen to be pumped through the engine as the valves follow a constant lift command. In other words, the engine is started in a manner that is similar to an engine having a fixed valve lift amount and similar emissions may be expected. For example, during starting, engine position may not be known until the engine has rotated to a certain position. As a result, cylinder fueling may be delayed so that the cylinders may be fueled in a predetermined combustion order (e.g., 1-3-4-2 for a four cylinder engine). By delaying fueling and thus delaying combustion, air may be pumped through the engine to a catalyst, during at least a portion of the starting sequence. The air may cool the catalyst and may also supply oxygen to catalyst sites that may have otherwise reduced NOx. Consequently, lower catalyst temperatures and fewer reduction sites may decrease catalyst efficiency during an engine start.

The inventors herein have recognized the above-mentioned disadvantages and have developed a method of controlling a variable event valvetrain that offers substantial improvements.

SUMMARY

One embodiment of the present description includes a method to control a variable event valvetrain during stopping an internal combustion engine, the method comprising: reducing a valve lift amount of at least a cylinder in response to a request to stop said engine; and stopping fuel flow to said cylinder when said reduced valve lift amount reduces the cylinder air charge of said cylinder below a predetermined amount.

By reducing valve lift after a request to stop an engine and by deactivating fuel when the air amount inducted into a cylinder is below a level that likely supports a desired combustion stability level, engine emissions and undesirable operator perceptions may be reduced. For example, valve lift and cylinder fueling can be adjusted in a controlled manner to reduce engine torque during an engine stop sequence, at least during some conditions. However, stopping fuel flow when a cylinder inducted air amount reaches a predetermined level (e.g., an air amount that can result in a desired level of likely combustion stability) can reduce engine emissions since engine misfires may be reduced, thereby decreasing the amount of exhausted hydrocarbons. In addition, audible engine noise and engine torque may be more uniform since combustion may be more consistent.

Further, another embodiment of the present description includes a method to start a variable event valvetrain internal combustion engine, the method comprising: increasing the speed of said internal combustion engine during a start from a stopped position after a request to start said internal combustion engine; and increasing an intake valve lift amount of at least a cylinder during said start.

By increasing valve lift as engine speed increases during an engine start, engine emissions and the amount of oxygen pumped to an exhaust system catalyst during engine starting may be reduced. Variable event valvetrains may be commanded to a low lift position, including zero lift, for at least a portion of the interval between engine stop and a predetermined engine speed (e.g., idle speed). By operating the variable event valvetrain at a low lift position the amount of air pumped through the engine may be reduced. As engine speed increases, and as engine position is determined, valve lift may be increased so that combustion may be initiated in selected cylinders. In this way, lower valve lift amounts can reduce oxygen flow to a catalyst during a portion of a starting sequence and higher valve lift amounts can be used to increase cylinder charge so that torque can be generated during another portion of the starting sequence.

In addition, during a start, fuel flow can be stopped until an inducted air amount reaches a level that reduces the chance of misfires. This may further reduce engine starting emissions.

The present description may provide several advantages. Specifically, the approach may improve engine emissions by reducing the amount of oxygen that may be pumped to a catalyst between the time that the engine is commanded to stop and the time the engine is restarted. In addition, the method may be used to reduce driver perceivable disturbances, namely, engine torque and audible engine noise. Further, the method may also provide shortened engine start and/or engine stop times which may lower emission levels.

The above advantages and other advantages, and features of the present description will be readily apparent from the following Detailed Description when taken alone or in connection with the accompanying drawings.

BRIEF DESCRIPTION OF THE DRAWINGS

The advantages described herein will be more fully understood by reading an example of an embodiment, referred to herein as the Detailed Description, when taken alone or with reference to the drawings, wherein:

FIG. 1 is a schematic diagram of an engine;

DETAILED DESCRIPTION

Figure 2A:
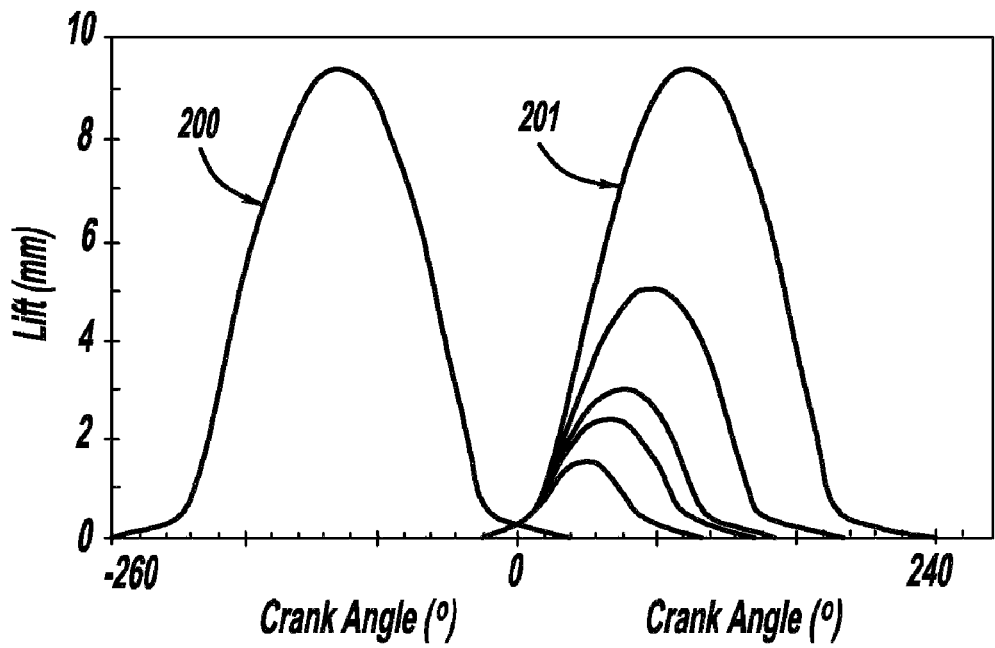
FIG. 2a is an illustrative valve event profile for an example variable event valvetrain.

Referring to FIG. 1, internal combustion engine 10, comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 40. Combustion chamber 30 is shown communicating with intake manifold 44 and exhaust manifold 48 via respective intake valve 52 an exhaust valve 54. The exhaust valve is operated via cam 53 and the intake valve is operated via variable event actuator 51. Alternatively, both exhaust valve 54 and intake valve 52 may be operated by variable event actuators. The variable event valve actuator may be a mechanical apparatus that is controlled by electrical or hydraulic components, or alternatively, the valve actuator may be electrically or hydraulically driven, or may be comprised of a combination of mechanical, electrical, and/or hydraulic components, electromechanical valves for example. In addition, the valve actuator may be capable of adjusting valve lift, valve phase or the combination of phase and lift. Some actuator designs may allow zero valve lift, a minimum lift, negative valve overlap between intake and exhaust valves, positive valve overlap between intake and exhaust valves, and/or combinations of lift and phase adjustment amounts. U.S. Pat. No. 6,145,483 describes one example of a variable valve actuator and is hereby fully incorporated by reference.

Intake manifold 44 is shown having fuel injector 66 coupled thereto for delivering liquid fuel in proportion to the pulse width of signal FPW from controller 12. Fuel is delivered to fuel injector 66 by fuel system (not shown) including a fuel tank, fuel pump, and fuel rail (not shown). Alternatively, the engine may be configured such that the fuel is injected directly into the engine cylinder, which is known to those skilled in the art as direct injection. In addition, intake manifold 44 is shown communicating with optional electronic throttle 125. Further, an air mass sensor (not shown) may be located upstream of throttle 125, if desired.

Distributorless ignition system 88 provides ignition spark to combustion chamber 30 via spark plug 92 in response to controller 12. Universal Exhaust Gas Oxygen (UEGO) sensor 76 is shown coupled to exhaust manifold 48 upstream of catalytic converter 70. Alternatively, a two-state exhaust gas oxygen sensor may be substituted for UEGO sensor 76. Two-state exhaust gas oxygen sensor 98 is shown coupled to exhaust pipe 49 downstream of catalytic converter 70. Alternatively, sensor 98 can also be a UEGO sensor. Catalytic converter temperature is measured by temperature sensor 77, and/or estimated based on operating conditions such as engine speed, load, air temperature, engine temperature, and/or airflow, or combinations thereof.

Converter 70 can include multiple catalyst bricks, in one example. In another example, multiple emission control devices, each with multiple bricks, can be used. Converter 70 can be a three-way type catalyst in one example. Alternatively, the converter may be a NOx trap, Hydrocarbon trap, oxidation catalyst, or a selective oxidation catalyst.

Controller 12 is shown in FIG. 1 as a conventional microcomputer including: microprocessor unit 102, input/output ports 104, and read-only-memory 106, random-access-memory 108, keep-alive-memory 110, and a conventional data bus. Controller 12 is shown receiving various signals from sensors coupled to engine 10, in addition to those signals previously discussed, including: engine coolant temperature (ECT) from temperature sensor 112 coupled to water jacket 114; a position sensor 119 coupled to an accelerator pedal; a measurement of engine manifold pressure (MAP) from pressure sensor 122 coupled to intake manifold 44; a measurement (ACT) of engine air charge temperature or manifold temperature from temperature sensor 117; and an engine position sensor from a Hall effect sensor 118 sensing crankshaft 40 position. In a preferred aspect of the present description, engine position sensor 118 produces a predetermined number of equally spaced pulses every revolution of the crankshaft from which engine speed (RPM) can be determined.

Referring to FIG. 2a, illustrative valve event profiles 201 and 200 for respective intake and exhaust valves of a variable event valvetrain are shown. The x axis represents crankshaft angle over a portion of a four-stroke cylinder cycle. Crankshaft angle markings are reference to top-dead-center (TDC, 0°) on the illustrated cylinder. The y axis indicates the valve lift of intake and exhaust valves. The intake and exhaust valve lift profiles illustrate the amount of intake or exhaust valve lift at a particular crankshaft position. The figure shows that various intake valve lift amounts may be achieved at different valve actuator operating positions. A high lift intake profile is illustrated by curve 201. Further, this design may include a zero lift position, whereby valve opening may be inhibited. By adjusting the valve lift, the inducted cylinder air amount may be varied at a given engine operating condition. Consequently, engine torque may be regulated by adjusting valve lift and/or phase.

In an alternate embodiment, the exhaust valve may also have a means for variable actuation. In this configuration, the exhaust profile may be similar to the illustrated intake profile. Alternatively, an adjustable exhaust valve profile may be constructed such that it is different than the intake valve adjustment profile.

Figure 2B:
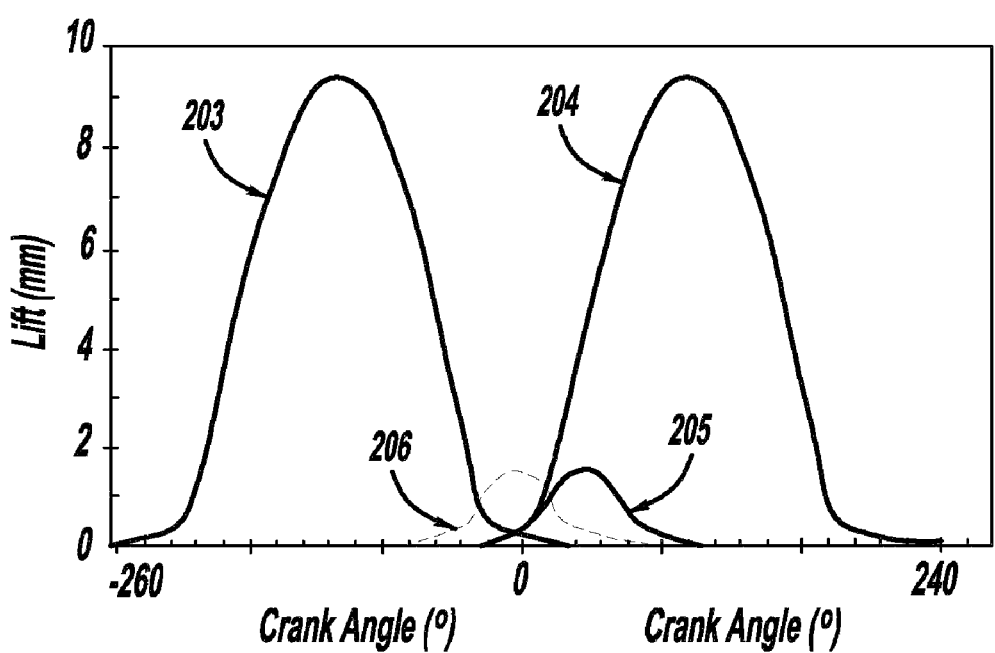
FIG. 2b is another illustrative valve event profile for an example variable event valvetrain.

Referring to FIG. 2b, illustrative valve event profiles 204 and 203 for respective intake and exhaust valves of an alternate variable event valvetrain that has a minimum valve lift and valve phase control is shown. This plot is similar to that of FIG. 2a, but a minimum lift profile 205 is shown in a second phased position 206. In one example, where a valve actuator device has to operate with at least a minimum lift amount, low amounts of cylinder air charge may be achieved by phasing the minimum valve lift profile so that the peak valve lift is near TDC 206. In other words, cylinder air amount may be adjusted by moving intake valve opening (IVO) and/or closing positions (IVC). Also, the amount of intake and exhaust valve overlap may also be regulated by adjusting intake and/or exhaust valve phase to further reduce the amount of air that may be pumped through a cylinder. Valve phase adjustment mechanisms, absent lift control, may allow a simpler actuator design to reduce inducted air amount to a level approaching the zero lift valvetrain.

To increase or decrease the amount of inducted cylinder air, valve lift and/or phase may be adjusted individually or simultaneously. Also, the valve operating strategy can be based on the respective valve durations and/or range of phase authority, for example.

Figure 3A:
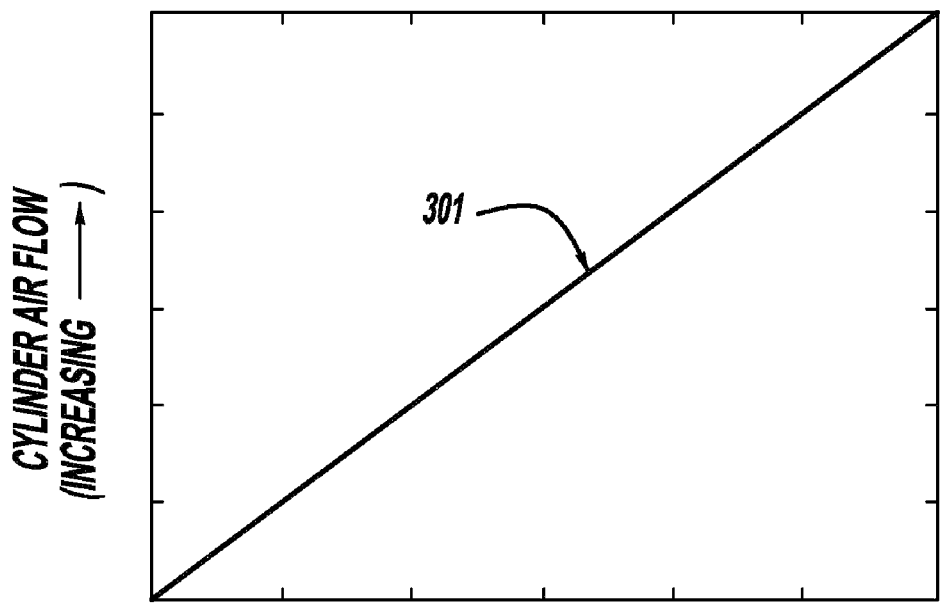
FIG. 3a is an example plot of cylinder air flow versus valve lift at a constant engine operating conditions.

Referring to FIG. 3a, an example plot of cylinder air flow versus valve lift at constant engine operating conditions is shown. The plot illustrates the relationship between valve lift and cylinder air flow for a valve actuator that is capable of varying valve lift from zero lift to a higher lift amount. The x axis of the plot represents a valve lift amount while the y axis represents flow rate into the cylinder. The figure shows line 301 that illustrates a linear relationship between valve lift and flow into a cylinder. However, the lift/flow relationship may change due to intake valve/port geometry and the pressure ratio between the intake manifold and the cylinder. This plot shows that cylinder air flow can be reduced to zero and illustrates that the amount of oxygen pumped to a catalyst during engine start or stop may be reduced by adjusting valve lift.

Figure 3B:
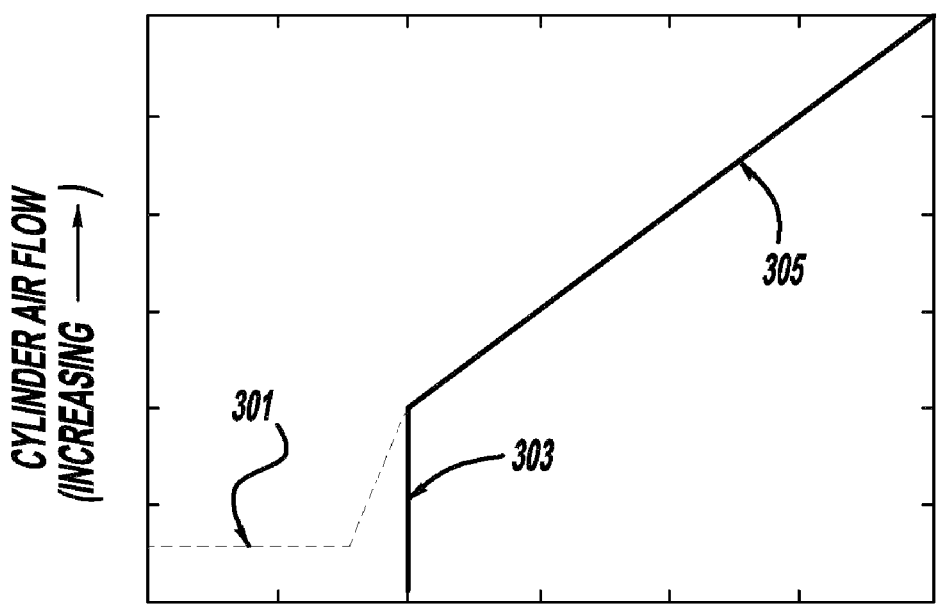
FIG. 3b is another example plot of cylinder air flow versus valve lift at constant engine operating conditions.

Referring to FIG. 3b, another example plot of cylinder air flow versus valve lift at constant engine operating conditions is shown. Similar to FIG. 3a, the x axis represents valve lift amount while the y axis represents cylinder air flow. An alternate actuator design may produce this air flow versus lift profile by being limited to a minimum valve lift and by allowing intake valve opening and closing to be phased (moved) with respect to a crankshaft position. Varying valve lift at a fixed valve phase can produce a sloped line similar to line 305. If the valve actuator phase adjustment can limit flow through the cylinder, the cylinder flow characteristics can transition from line 305 to line 303 so that cylinder flow is reduced when a minimum valve lift level is reached. On the other hand, it may be possible that adjusting the valve phase reduces the flow through the cylinder to some near constant amount as shown by line 302. By changing the valve phase relative to a crankshaft position, cylinder air flow may be reduced from line 305 to line 302 since the valve opening and closing positions can determine the amount of inducted air. This plot shows that valve lift may be used in conjunction with valve phase as an alternate method to reduce cylinder air flow during engine stopping and starting.

Figure 4:
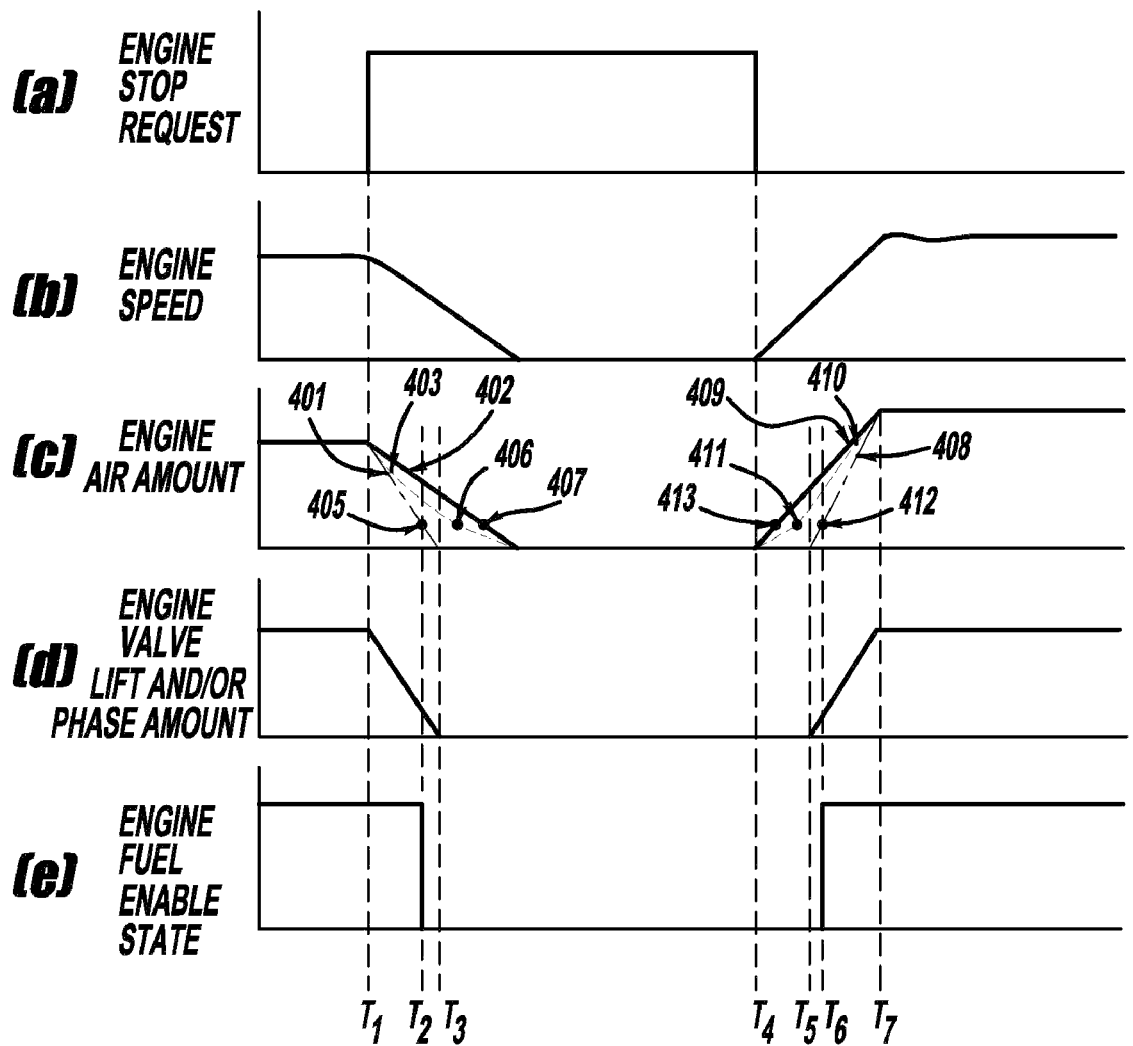
FIG. 4 is an example plot of signals that may be of interest during a simulated engine stop and start sequence.
Figure 5:
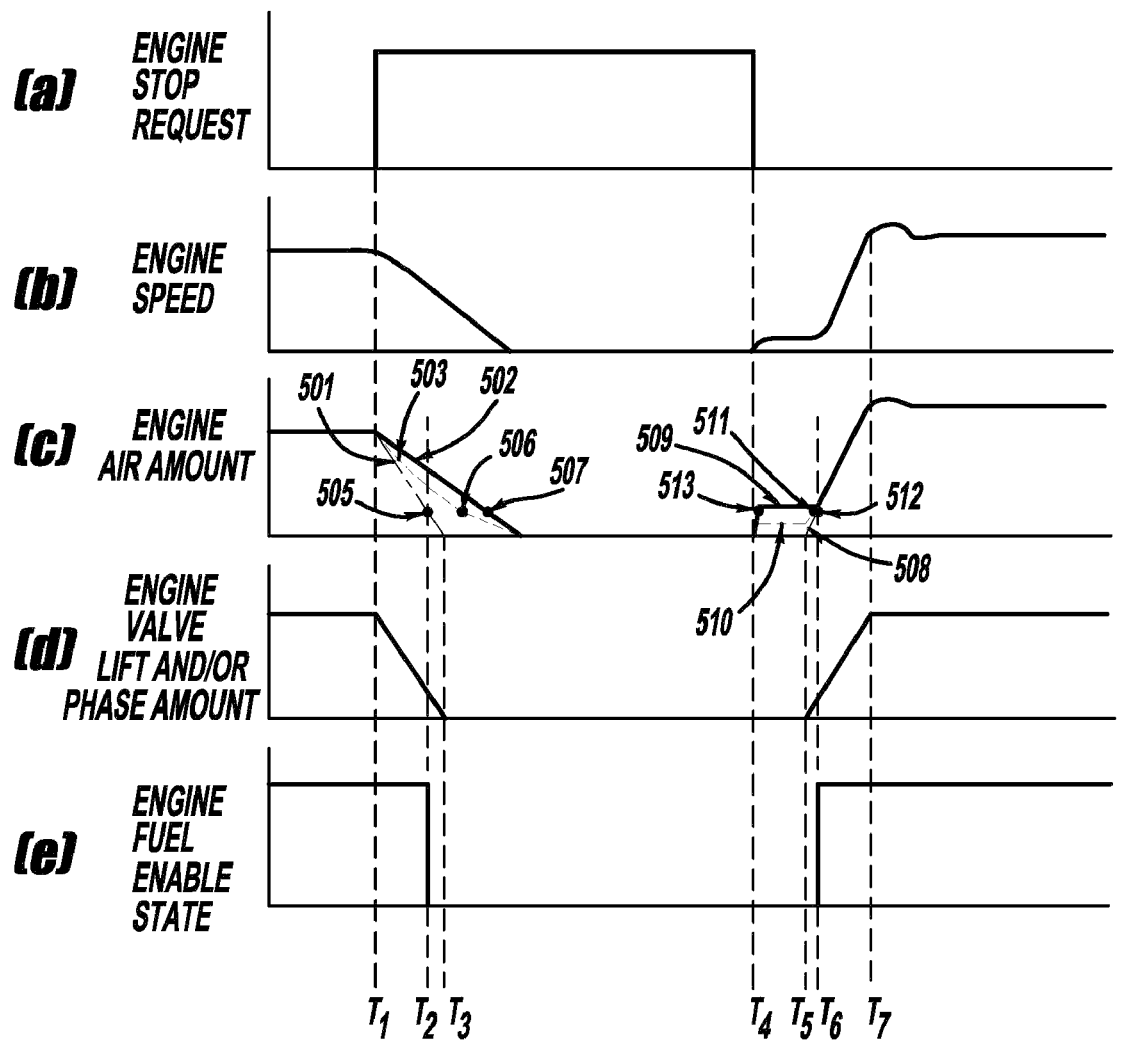
FIG. 5 is an example plot of signals that may be of interest during an alternate simulated engine stop and start sequence.

Referring to FIG. 4, an example plot of signals that may be of interest during a simulated engine stop and/or start is shown. An engine start may include a cranking period (Ref. FIG. 5), an assisted nearly constant rate of engine speed increase from a stop (Ref. FIG. 4(b)), or a cylinder initiated direct start. A starting interval may be defined in a number of ways including: a period between the point where engine rotation begins and when engine speed reaches a predetermined speed (e.g., idle speed); a period between the point where engine rotation begins and when engine speed reaches a predetermined speed under power of the engine; a period between the point where engine rotation begins and when engine speed has passed through a predetermined speed a predetermined number of times; or a period between the point where engine rotation begins and when engine speed has reached a predetermined speed for a predetermined period of time.

Graph (a) represents an example engine stop request signal. This signal may be generated by an operator acting on a switch or automatically by a controller that monitors vehicle operating conditions and determines when to stop and/or start the engine, a hybrid powertrain controller for example. The high portion of the signal represents a command or request to stop the engine while the low signal portion represents a request to start the engine or to continue to operate the engine. The timing of the engine stop request relative to the other signals of FIG. 4 is illustrated by vertical lines $T_1$ and $T_4$.

Graph (b) illustrates an example engine speed trajectory during a request to stop and start an engine. In some hybrid vehicle configurations, engine speed may be controlled using the secondary motor or independently from the secondary power plant (e.g., an electric or hydraulic motor). U.S. Pat. Nos. 6,176,808 and 6,364,807 describe a hybrid powertrain that may be capable of controlling engine speed via a secondary motor and independent engine and motor speed control. The patents are hereby fully incorporated by reference. This engine speed trajectory represents one of several trajectories that may be possible by controlling engine speed in a hybrid powertrain. In one example, an electric motor and a transmission can be used to control engine speed during stopping and starting. In addition, the valve lift and phase may be controlled with respect to the engine position and speed so that the inducted air amount may be regulated. In the figure, engine deceleration and acceleration are controlled during respective start and stop sequences. The engine speed and valve timing may be adjusted simultaneously to provide a desired cylinder air amount.

Graph (c) shows three example cylinder air flow amounts over a number of combustion events during engine starting and stopping. During engine stopping a fixed cam mechanical valvetrain can induct air similar to the way that is described by line 402. Since the valve timing is fixed, the cylinder air flow may be largely a function of engine speed. The cylinder air flow described by this line is the highest of the three examples. Cylinder air flow using a fixed cam mechanical valvetrain during a start may be described by line segment 409. FIG. 4 shows the engine stop request at a low level $T_4$, indicating start and operate the engine, and engine speed increasing after the engine stop request has been withdrawn. The cylinder and engine air flow increases as the engine speed increases. If the cylinder air flow increases while combustion is inhibited, oxygen pumped through the engine may cool and/or occupy catalyst sites that may be used to reduce NOx. Consequently, the efficiency of the catalyst may be reduced. On the other hand, if combustion is initiated at low cylinder air flows misfires may result. Therefore, it may be desirable during a start to limit cylinder air flow and inhibit combustion until a desired level of combustion stability may be attained.

Line 403 describes an example of cylinder air flow control using a variable event valve control mechanism that may be limited by certain lift amplitude and/or by a phase control constraints. For example, a valve actuator may be limited to 1 mm of valve lift during an intake stroke. On the other hand, another valve actuator may be limited to a certain valve phase amount at a constant lift amount. The valve actuator lift/phase amount control signal described by the fourth graph (d) shows an example trajectory for reducing cylinder air flow during an engine stop. After a request to stop the engine, the valve lift and/or phase may be adjusted to reduce cylinder air flow as shown in the graph (d). The effect of engine speed and valve lift/phase on cylinder air flow can be seen in line 403 which shows two distinct segments that can describe air flow during an engine stop. The first segment after a request to stop the engine describes the effect of engine speed reduction and valve adjustments. The second distinct line segment occurs after the valve lift/phase described by the graph (d) is complete (i.e., at some reduced lift and/or altered phase amount). This line segment shows that the valve actuator lift and/or phase limitations may not completely stop engine air flow through the engine while the engine is rotating, but that cylinder air flow can be reduced compared to a fixed timing mechanical valvetrain.

During engine starting, a lift/phase limited valve actuator may be controlled such that the actuator can be indexed from a partial or minimum flow position to another partial or full range flow position. By keeping the actuator at a minimum flow position the air flow through the engine may be reduced during a start. For example, line 410 shows one possible air flow reduction strategy during starting. Cylinder air flow may be reduced while the engine speed is below a target or desired amount, and then increased to a partial or full amount of the actuator range as the engine speed approaches a target speed, idle speed for example. This strategy can lead to cylinder air flow that may be represented by the two segment line 410.

Cylinder air flow for a valve actuator that may be capable of reducing cylinder air flow to near zero during an engine stop may be described by line 401. This line shows an engine air flow amount that can be a function of engine speed and valve lift and/or phase. When the actuator reaches the minimum position illustrated in the graph (d), engine air flow is reduced to or near zero. Line 401 illustrates that it may possible to reduce the cylinder air amount to a level that is lower than the amount described by line 402 (fixed cam valvetrain) and line 403 (limited range valve actuator).

Engine starting may be further improved by allowing little or no air flow through an engine during starting. As described above, air flow through an engine during starting can reduce catalyst efficiency. Line 408 illustrates the result of one engine air flow amount control strategy that may be used to reduce the amount of oxygen that may be pumped to a catalyst during starting. Specifically, the air flow may be limited until a desired or target engine speed. Then, air flow may be increased until a desired engine or cylinder air flow amount is achieved.

Graph (d) illustrates one example of a valve lift trajectory that may be used to regulate engine and/or cylinder air flow. In this example, the valve lift command is reduced from an initial value at $T_1$ to a value at $T_3$. Alternately, the lift reduction may begin at a time before or after the engine request stop time. That is, the engine stop may be delayed until a predetermined valve lift adjustment has been achieved, if desired. In addition, the valve lift and/or phase amount does not have to be linearly ramped to a reduced position. Rather, the lift reduction and/or phase adjustment may be a step or stepped transition, an exponential decay transition, or a transition that may be a combination of the previously mentioned methods.

As mentioned above, increasing valve lift during an engine start may be delayed to reduce engine air flow. The engine start illustrated by FIG. 4 delays the valve lift adjustment for the period between $T_4$ and $T_5$ and completes the adjustment by $T_7$ where the desired engine speed is reached. In this example the delay time before valve lift adjustment ($T_5 - T_4$) can be determined from the amount of time it can take to accelerate the engine from a stop to the desired start speed ($T_4$ to $T_7$), minus the time that it can take to move the valve lift actuator. Similar to the stop sequence, the valve lift amount does not have to be linearly ramped to a higher lift amount during a start. The lift may be a step or stepped transition, an exponential rise transition, or a transition that may be a combination of the before mentioned methods.

As described above, depending on the valve actuator design, it may also be possible to adjust valve timing to control engine and cylinder air flow. Valve phase may be adjusted in a manner that is similar to that illustrated by graph (d). However, valve timing may be advanced or retarded to reduce the amount of engine air flow depending on the base valve timing and the phaser range of authority.

Graph (e) shows an example of fuel delivery control during engine stopping and starting. Fuel flow is stopped at $T_2$, a location that may be coincident with an engine or cylinder air amount that designates a lower boundary of air necessary for a desired level of combustion stability. That is, fuel flow may be stopped when combustion stability is likely to be less than a desired level, thereby reducing misfires. In this example, fuel can be stopped at a cylinder air amount identified at location 405 for a valvetrain that may be capable of reducing cylinder air flow to near zero, at location 406 for a valvetrain capable of limited cylinder air flow reduction, and at location 407 for a valvetrain having fixed cam mechanically actuated valves.

Fuel control during a start is also shown in graph (e). Fuel may be enabled at $T_6$ where an increase in valve lift can allow a cylinder to induct an air amount that may produce a desired level of combustion stability. Delaying fuel until a level of combustion stability may be attainable may reduce engine emissions and driver disturbances since the number of cylinder misfires may be reduced. In this example, fuel may be delayed during a start for a cylinder air amount identified at location 412 for a valvetrain that may be capable of reducing cylinder air flow to near zero, at location 411 for a valvetrain capable of limited cylinder air flow reduction, and at location 413 for a valvetrain having a fixed cam mechanically actuated valves.

An alternative method to start a variable event valvetrain can be to increase engine speed from a stop to a predetermined speed (e.g., idle speed) while the valve lift or phase is set to a reduced amount and while fuel flow is stopped. At or near the predetermined desired engine speed, fuel flow may be activated and valve lift may be increased or valve phase may be adjusted so that combustion may be initiated in one or more cylinders. In other words, at an engine stop, valve lift may initially be set to zero or to a partial lift amount, when the engine reaches a predetermined speed the valve lift may be set to an increased partial lift amount or to a full lift amount. Intake and/or exhaust valves may be controlled in this manner, but engine starting may be more difficult if flow through exhaust valves is reduced since more exhaust residuals may be included in the cylinder mixture. In this way, valve timing can reduce or stop oxygen flow to an exhaust catalyst so that catalyst efficiency may be increased.

Note: A hybrid powertrain may have two or more potential torque output devices and is hereby defined as the combination of an internal combustion (IC) engine with a secondary power system. For example, a hybrid powertrain may comprise a combination of an IC engine and an electric motor, an IC engine and a hydraulic power system, an IC engine and a pneumatic power system, an IC engine and one or more energy storage flywheels, and various combinations of the before mentioned systems. In addition, during an engine stop it is not necessary that the valve lift/phase be adjusted from a maximum to a minimum valve lift. In other words, the valve lift can be reduced during the stop sequence from a first lift amount to a second lift amount. Also, the effect that the valve lift/phase amount adjustment has on engine air flow may depend on engine speed, valve geometry, and initial and/or final lift amount. Likewise, during an engine start it is not necessary to increase the valve lift amount from a minimal amount to a maximal amount. The valve lift may be increased from a first amount to a second amount. Furthermore, the valve lift and/or phase of exhaust valves may also be adjusted during an engine stop sequence, but it may be preferential to reduce exhaust valve lift after engine speed is at or near zero since decreasing exhaust valve lift may increase combustion residuals and reduce combustion stability.

Referring to FIG. 5, an example sequence that illustrates an alternative simulation of an engine stop and start is shown. The signals and graphs are similar to those shown in FIG. 4. However, FIG. 5 illustrates a different engine starting method. In particular, engine starting with the assistance of a conventional starter motor is shown.

Graph (a) shows an example engine stop request signal. As mentioned above, the request to stop may be generated in a number of ways including by a driver or by a hybrid powertrain controller.

Graph (b) shows engine speed during a stop and a start. The engine stop sequence is the same as in FIG. 4, but in this example no engine speed control is provide by a secondary motor (e.g., an electric or hydraulic motor).

Engine starting speed is shown on the right hand side of the graph (b). The figure shows engine speed increasing and leveling off to a cranking speed (i.e., the cranking period) by way of a starter motor. Cranking occurs approximately during the period between $T_4$ and $T_6$. After fuel is introduced at location $T_6$ the engine speed begins to increase from the resulting in-cylinder combustion. After run-up (i.e., the interval between engine cranking speed and engine idle speed where the engine is accelerating) the engine speed stabilizes at a predetermined level, idle speed for example. However, it is not necessary that the engine speed remain at idle speed, the engine speed may change after the run-up period in response to operator demand.

Graph (c) shows cylinder air flow over a number of combustion events during engine starting and stopping. Cylinder air flow lines 501, 502, and 503 show cylinder air flows for a valvetrain that can reduce flow to or near zero, a fixed cam mechanically driven valvetrain, and valvetrain actuator having a limited range of authority, respectively. Fuel flow is stopped at a cylinder air amount that is represented by the respective cylinder air flow curves at locations 505, 507, and 506.

Similar to the sequence illustrated by FIG. 4, engine air amount can be reduced during a stop sequence so that combusted gases continue to heat and provide exhaust gases to a catalyst. The combusted gases flow to the catalyst until a desired predetermined level of combustion stability may not be attained. Further, air flow may be reduced until a low lift or a desired valve phase is reached.

When starting by a starter cranking method, the cylinder air amount for respective valvetrains may be illustrated by lines 508, 509, and 510. Cylinder air flow for a valvetrain having a fixed cam mechanically actuated valves corresponds to line 509, a valvetrain actuator having limited range of authority may be represented by line 510, and a valvetrain actuator capable of cylinder air flow to or near zero may be represented by line 508. Fuel flow is started at a cylinder air amount that is represented by the respective cylinder air flow curves at locations 513, 512, and 511.

Graph (d) illustrates an example valve actuator lift and/or phase amount during engine stopping and starting. Cylinder air flow reduction by adjusting a valve actuator begins at $T_1$, coincident with the engine stop request, and ends at $T_3$.

On the right hand side of the graph (d), valve actuator adjustment is shown during a start. In this example, the valve adjustment is delayed for a time after the request to stop the engine has been withdrawn. The delay period duration may be zero or it may be a function of the time to recognize engine position, engine position at start, time to pressurize the fuel delivery system, engine temperature, or any other engine or vehicle operating condition, for example.

Graph (e) of FIG. 5 illustrates the timing of enabling fuel flow during engine stopping and starting. During this example engine stopping sequence, fuel is stopped at location $T_2$ which corresponds to a cylinder air charge at location 505 of the curve that represents one method of controlling a valve actuator that may be capable of zero or near zero cylinder air flow. Locations 506 and 507 represent air charge amounts that are equivalent to location 505 using different valve actuation methods, but the time that it takes to achieve these levels of cylinder air charge may be increased since cylinder air amount is being reduced at a lower rate. Consequently, in other examples, fuel flow deactivation may be delayed by the amount of time that it may take to reach the cylinder air amount that represents a desired level of combustion stability. This method can be used to decrease engine torque while providing a combusted mixture to the catalyst, and may reduce the amount of air that may be pumped to the catalyst during an engine stop.

Fuel flow enablement during a start is shown by the right hand side of graph (e). At location $T_6$ fuel is activated, this location corresponds to the cylinder air amount 512 that can provide a desired level of combustion stability. Cylinder air amounts at locations 513 and 511 are the same level of cylinder air amount at location 512, but the cylinder air charge levels are achieved before the time that the cylinder air charge is achieved at location 512. In other words, during cranking and run-up more air may flow through an engine having a fixed cam mechanically actuated valvetrain or through a limited range adjustable valvetrain than through a valve actuator that may be capable of zero or near zero cylinder air flow. Reducing the air flow through the engine during cranking and run-up may reduce engine emissions. For example, fuel may be delayed during a start so that the engine controller has time to determine engine position and deliver a fuel amount to a selected cylinder. However, by delaying fuel flow during a start, some cylinders may pump air though the engine thus cooling and/or oxygenating the catalyst, thereby potentially reducing catalyst efficiency during a subsequent restart.

Figure 6:
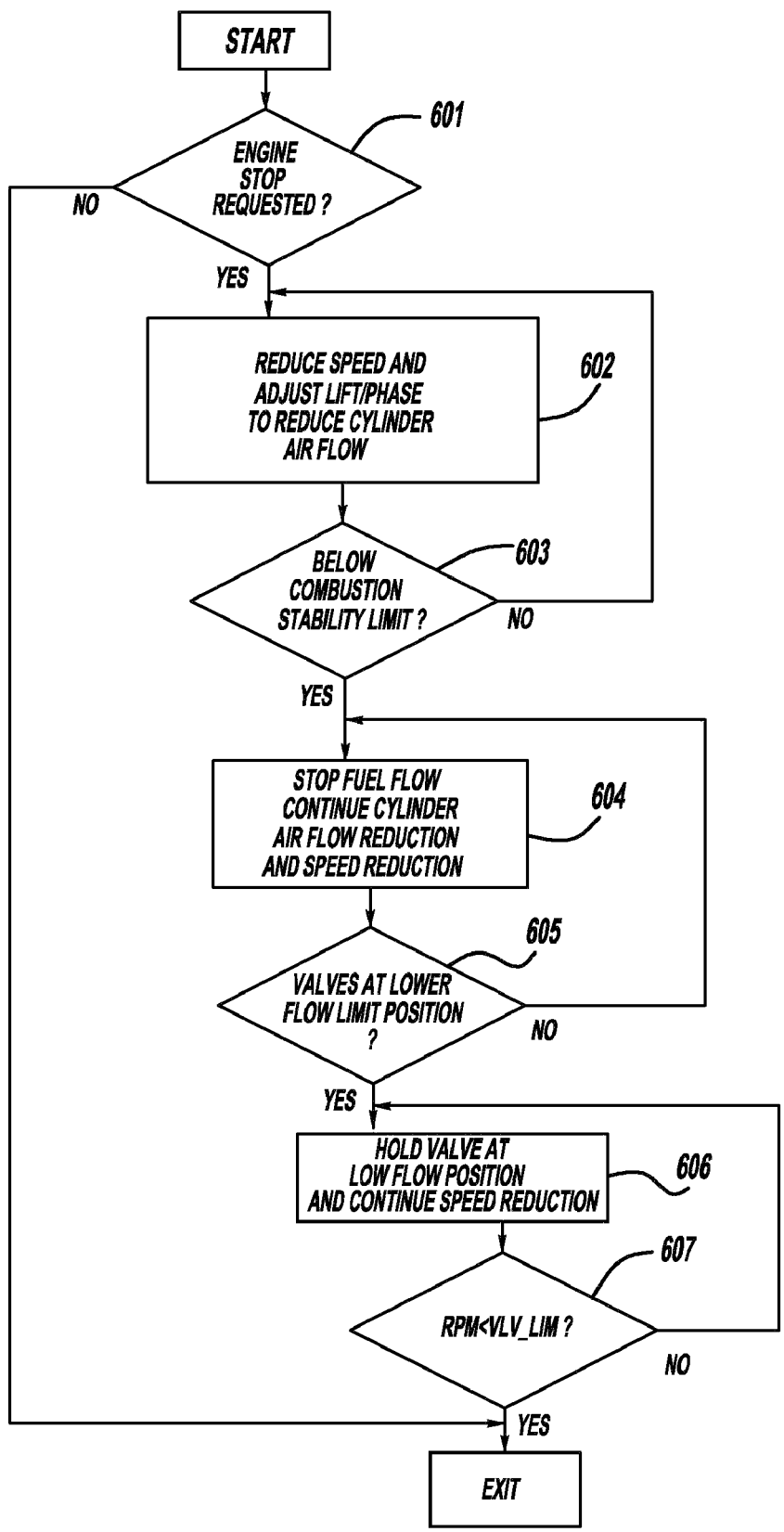
FIG. 6 is a flow chart of an example stopping sequence for a variable event valvetrain engine.

Referring to FIG. 6, a flow chart of an example engine stopping sequence for a variable event valvetrain engine is shown. During an engine shutdown (i.e., an engine stop sequence) some engines are stopped by immediately stopping fuel flow and spark to the engine cylinders. After fuel flow is stopped the engine can continue to rotate as the engine speed decreases. As a consequence, air that has not participated in combustion may be pumped from the intake manifold to the exhaust system and through a catalyst. This may increase engine emissions when the engine is restarted since the air may cool the catalyst and/or the oxygen in air may occupy catalyst sites that otherwise could be used to reduce NOx.

In step 601, the routine determines if a request to stop the engine has been made. If a request has not been made to stop the engine the routine exits. The routine of FIG. 6 can be repeatedly executed at predetermined times or in response to an engine or controller operating event so that valve adjustments may be readily made. If a request has been made the routine continues to step 602.

In step 602, engine speed can be reduced, and cylinder air flow may also be reduced by adjusting a valve actuator mechanism. In one embodiment, valve lift and fuel amount may be adjusted to reduce the cylinder charge mass, thereby, reducing the available cylinder torque. In another embodiment, valve phase (i.e., the valve opening and/or closing positions relative to a crankshaft position) and fuel may be adjusted to reduce the cylinder charge mass. In yet another embodiment, valve lift, valve phase, and fuel amount may be adjusted to reduce the cylinder charge mass. The adjustments to valve lift and phase may be made simultaneously or consecutively. The fuel adjustment may be made proportionally to the cylinder air amount adjustment or it may be a function of engine operating conditions, such as engine temperature and time since start, for example.

A number of different methods may be used to adjust the valve actuator (e.g., valve lift and/or valve opening and/or closing phase) so that cylinder air charge and/or engine torque may be lowered during an engine stop. In one embodiment, the valve lift may be reduced from a high lift location by a predetermined rate, 0.05 mm/sec or 0.05 mm/combustion event for example. In another embodiment, the valve opening and closing positions may be retarded or advanced by 100 crankshaft angle degrees per second, for example, so that the inducted air charge may be lowered. In yet another embodiment, the valve lift or phase may be adjusted in further response to engine operating conditions, barometric pressure and/or desired torque for example.

In one example, intake valve timing and lift may be adjusted while exhaust valve timing can be fixed so that exhaust valve opening and closing positions are known. In this example and other examples, the method described in U.S. patent application Ser. No. 10/805,642 can be used to determine cylinder air amount after a request to stop an engine and the application is hereby fully incorporated by reference. Individual cylinder air amounts can be determined from cylinder pressure which can be related to engine torques by the following equation:

$$IMEP_{cyl}(\text{bar}) = \left(\frac{\Gamma_{brake} - (\Gamma_{friction\_total} + \Gamma_{pumping\_total} + \Gamma_{accessories\_total})}{Num\_cyl_{Act}}\right) * \frac{4\pi}{V_D} * \frac{(1*10^{-5} \text{ bar})}{N/m^2} \cdot SPKTR$$

Where $IMEP_{cyl}$ is the cylinder indicated mean effective pressure, $\Gamma_{brake}$ is engine brake torque, $\Gamma_{friction\_total}$ is the total engine friction torque, $\Gamma_{pumping\_total}$ is the total engine pumping torque, $\Gamma_{accessories\_total}$ is the total engine accessories torque, $Num\_cyl_{Act}$ is the number of active cylinders, $V_D$ is the displacement volume of active cylinders, SPKTR is a torque ratio based on spark angle retarded from minimum best torque (MBT), i.e., the minimum amount of spark angle advance that produces the best torque amount. By reducing the engine brake torque, engine speed may be reduced during a stop.

The term SPKTR can be based on the equation:

$$SPKTR = \frac{\Gamma_{\Delta SPK}}{\Gamma_{MBT}}$$

Where $\Gamma_{\Delta SPK}$ is the torque at a spark angle retarded from minimum spark for best torque (MBT), $\Gamma_{MBT}$ is the torque at MBT. The value of SPKTR can range from 0 to 1 depending on the spark retard from MBT.

Individual cylinder fuel mass can be determined, in one example, for each cylinder by the following equation:

$$m_f = C_0 + C_1*N + C_2*AFR + C_3*AFR^2 + C_4*IMEP + C_5*IMEP^2 + C_6*IMEP*N$$

Where $m_f$ is mass of fuel, $C_0$-$C_6$ are stored, predetermined, regressed polynomial coefficients, N is engine speed, AFR is the air-fuel ratio, and IMEP is indicated mean effective pressure. Additional or fewer polynomial terms may be used in the regression based on the desired curve fit and strategy complexity. For example, polynomial terms for engine temperature, air charge temperature, and altitude might also be included.

A desired air charge can be determined from the desired fuel charge. In one example, a predetermined air-fuel mixture (based on engine speed, temperature, and engine load), with or without exhaust gas sensor feedback, can be used to determine a desired air-fuel ratio. The determined fuel mass from above can be multiplied by the predetermined desired air-fuel ratio to determine a desired cylinder air amount. The desired mass of air can be determined from the equation:

$$m_a = m_f AFR$$

Where $m_a$ is the desired mass of air entering a cylinder, $m_f$ is the desired mass of fuel entering a cylinder, and AFR is the desired air-fuel ratio.

Some variable event valve trains may vary the valve closing position with the valve lift height, reference FIG. 2a for example. In other variable event valve trains the valve opening and valve closing locations may vary with valve lift height. In yet other variable event valve trains, the valve opening position may vary with valve lift. Consequently, a method that can determine valve timing using a variety of valve actuators can be desirable.

In one example, valve timing and lift that can be used to induct the desired amount of air into a cylinder may be determined by the method described in U.S. Pat. No. 6,850,831 which is hereby fully incorporated by reference. Intake valve closing position can influence cylinder air amount, at least during some conditions, because inducted cylinder air amount can be related to the cylinder volume at IVC and the pressure in the intake manifold. Therefore, the cylinder volume that can hold the desired mass of air in the cylinder may be determined so that the IVC location may be established. In other words, the cylinder volume during the intake and/or compression stroke that can hold the desired air mass, at a given intake manifold pressure, may be resolved into a unique crankshaft angle, the angle describing IVC. The cylinder volume at IVC for a desired mass of air entering a cylinder may be described by the following equation:

$$V_{a,IVC} = \frac{m_a}{\rho_{a,IVC}}$$

Where $\rho_{a,IVC}$ is the density of air at IVC, $V_{a,IVC}$ is the volume of air in the cylinder at IVC. The density of air at IVC can be determined by adjusting the density of air to account for the change in temperature and pressure at IVC by the following equation:

$$\rho_{a,IVC} = \rho_{amb} \cdot \frac{T_{amb}}{T_{IVC}} \cdot \frac{P_{IVC}}{P_{amb}}$$

Where $\rho_{amb}$ is the density of air at ambient conditions, $T_{amb}$ is ambient temperature, $T_{IVC}$ is the temperature of air at IVC, $P_{IVC}$ is the pressure in the cylinder at IVC, and $P_{amb}$ is ambient pressure. In one example, where IVC occurs before bottom-dead-center (BDC), pressure in the cylinder at IVC can be determined by differentiating the ideal gas law forming the following equation:

$$\dot{P}_{IVC} = \frac{\dot{m}_{cyl} \cdot R \cdot T - P_{IVC} \cdot \dot{V}}{V}$$

Where $P_{IVC}$ is cylinder pressure, V is cylinder volume at a particular crankshaft angle, R is the universal gas constant, and $\dot{m}$ is flow rate into the cylinder estimated by:

$$\dot{m}_{cyl} = \frac{C_D \cdot A_{valve}(\theta) \cdot P_{run}}{\sqrt{R \cdot T}} \cdot \left(\frac{P_{cyl}}{P_{run}}\right)^{\frac{1}{\gamma}} \cdot \sqrt{\frac{2 \cdot \gamma}{\gamma - 1} \cdot \left(\frac{P_{IVC}}{P_{run}}\right)^{\frac{\gamma-1}{\gamma}}}$$

Where $C_D$ is the valve coefficient of discharge, $A_{valve}(\theta)$ is effective valve area as a function of crankshaft angle $\theta$, $P_{run}$ is the manifold runner pressure which can be assumed as manifold pressure at lower engine speeds, and $\gamma$ is the ratio of specific heats. $C_D$ is calibratible and can be empirically determined.

The effective valve area, $A_{valve}(\theta)$, can vary depending on the valve lift amount. The valve lift profile can be combined with the valve dimensions to estimate the effective area, $A_{valve}(\theta)$, via the following equation:

$$A_{valve}(\Theta) = L(\Theta) \cdot 2 \cdot \pi \cdot d$$

Where $L(\theta)$ is the valve lift amount that may be determined empirically by considering cylinder charge motion, combustion stability, minimum valve opening and closing duration, and emissions. The desired valve lift amount may be stored in tables or functions that may be indexed by engine operating conditions, for example.

The volume of intake mixture at IVC may be determined by the following equation:

$$V_{i,IVC} = \frac{V_{a,IVC} - (1 - F_e) \cdot V_{r,IVC}}{f_{air}}$$

Where $f_{air}$ is the proportion of air in the intake mixture, $V_{a,IVC}$ is the cylinder volume occupied by air at IVC as describe above, and $F_e$ is the fraction of burned gas in the exhaust manifold that can be determined by methods described in literature. For stoichiometric or rich conditions $F_e$ can be set equal to one. $F_{air}$ can be determined from:

$$f_{air} = \frac{1}{1 + \frac{1}{AFR} + F_i}$$

Where AFR is the air fuel ratio and $F_i$ is the fraction of burned gas in the intake manifold. $F_i$ can be estimated by methods described in literature. The volume occupied by the total mixture at IVC can be determined by the equation:

$$V_{IVC} = V_{i,IVC} - V_{cl} + V_{r,IVC}$$

Where $V_{cl}$ is the cylinder clearance volume, $V_{r,IVC}$ is the residual volume at IVC, and $V_{IVC}$ is the total cylinder volume at IVC. The volume occupied by residual gas at IVC can be described by:

$$V_{r,IVC} = \frac{T_{IVC}}{T_{exh}} \cdot \frac{P_{exh}}{P_{IVC}} \cdot (V_{r,EVC} + V_{cl})$$

Where $T_{IVC}$ is the temperature at IVC that may be approximated by a regression of the form $T_{IVC} = f(N, m_f, \theta_{ov})$. Where N is engine speed, $m_f$ is fuel flow rate, and $\theta_{ov}$ valve overlap. $T_{exh}$ is temperature in the exhaust manifold, $P_{exh}$ is pressure in the exhaust manifold, $V_{cl}$ is cylinder clearance volume, $P_{IVC}$ is pressure in the cylinder at IVC, and $V_{r,EVC}$ is the residual volume at EVC. In one example, where IVO is before EVC and where EVC and IVO are after TDC, $V_{r,EVC}$ can be described by:

$$V_{r,EVC} = \int \frac{A_e(\Theta)}{A_i(\Theta) + A_e(\Theta)} dV(\Theta)$$

Where the integral is evaluated from IVO to EVC, and where $A_i$ and $A_e$ are the effective areas of the intake and exhaust valves for $\theta \in (\theta_{IVO}, \theta_{EVC})$ that may be determined in the same manner as described above for $A_{valve}(\Theta)$. In this example, a predetermined valve lift can be used to describe an effective area of the intake valve opening. The intake valve area may be varied as a function of $\Theta$ so that for a certain cylinder temperature and pressure, a desired mass fraction of EGR may be trapped in a cylinder displacing a volume $V_{r,EVC}$.

The cylinder volume minus the clearance volume at IVC can then be used to determine intake valve closing position by solving the following equation for $\theta$:

$$V_\Theta = \frac{\pi B^2}{4} \left[ r + C - \left( C \cdot \cos\Theta + \sqrt{r^2 - C^2 \cdot \sin^2\Theta} \right) \right]$$

In this way, valve lift, IVC, and IVO can be determined by accounting for EGR and desired air amount.

In addition, engine fuel can also be adjusted in step 602 so that a desired exhaust air-fuel mixture may be achieved. During some conditions the exhaust gas air-fuel mixture may be lean while during other conditions the mixture may be rich or stoichiometric. For example, if an engine is stopped after being warm and if there may be a higher probability that the engine will restart, as with some hybrid vehicle applications, the air-fuel mixture can be commanded to stoichiometry so that the probability of disturbing an exhaust system catalyst may be reduced. The routine proceeds to step 603.

In step 603, a decision is made to continue reducing cylinder air amount or to proceed to a step that can stop fuel flow to the engine. If the valve timing determined from step 602 inducts a cylinder air amount that may not be sufficient for a desired level of combustion stability the routine proceeds to step 604. If the cylinder air amount may be above an amount that supports a desired level of combustion stability, the routine returns to step 602.

In step 604, fuel flow to the engine or cylinder can be stopped. Because cylinder air amount may be adjusted to a level that may be below a desired combustion stability limit, it can be desirable to stop fuel flow to the engine or to individual cylinders. Fuel flow may be stopped when at least one cylinder air amount may be below a desired amount or fuel may be stopped in individual cylinders as the respective cylinder air amount may be reduced below a desired amount. If fuel flow is stopped on an individual cylinder basis, the valve lift/phase may continue to be adjusted in cylinders that may not be below a desired cylinder air amount.

Spark may also be deactivated in step 604, preferably after the latest air-fuel mixture is combusted. Spark may be deactivated immediately after combusting the latest injected fuel or it may be deactivated after a predetermined number of cylinder cycles. By delaying spark deactivation, it may be possible to combust fuel that may be drawn into the cylinder from an intake manifold puddle, for example. The routine continues to step 605.

In step 605, valve lift and/or phase can be evaluated to determine if further adjustments may be desired. If the valve lift and/or phase are not at a desired low flow position the routine returns to step 604 where further valve actuator adjustment may be commanded. If the valve lift and/or phase are at a desired low flow position, the routine can proceed to step 606.

In step 606, valve lift and/or phase can be held in a low lift and/or phase position. Typically, variable event valve actuators can be designed with a minimum lift and/or phase position. In this position, the valve lift may be zero or some fraction of the total available lift amount. Valve phase may be advanced or retarded relative to TDC, for example. And alternatively, electrically actuated valves may be held in a position (e.g., closed) or at a desired phase by a valve controller commands. Consequently, in this step, valve operating commands can be structured based on the actuator design so that a reduced flow, including zero flow, may pass through the cylinder as the engine decelerates to zero speed.

By commanding the valves to a reduced lift and/or to a phase that reduces cylinder flow, oxygen pumped through the engine to a catalyst may be reduced. As mentioned above, reducing oxygen flow to a catalyst can improve engine emissions during a subsequent start since the catalyst state may maintain a desirable level of oxidants. By regulating the amount of oxygen that may be stored in a catalyst, catalytic reaction sites may be available for both oxidation and reduction reactions, thereby increasing the possibility of converting HC, CO, and NOx during a subsequent restart. On the other hand, if the amount of oxygen stored on the catalyst is greater than desired, the catalyst NOx reduction capacity may be diminished since some reduction sites may be occupied by oxygen. The routine proceeds to step 607.

In step 607, engine speed is compared to a predetermined level. If engine speed is below a predetermined level, vlv_lim, the routine exits. When the routine exits, the valve actuators may be set to a desired position so that air flow and the cooling and the oxygen that it can bring to a catalyst may be reduced. If engine speed is above the predetermined level, the routine returns to step 606.

Figure 7:
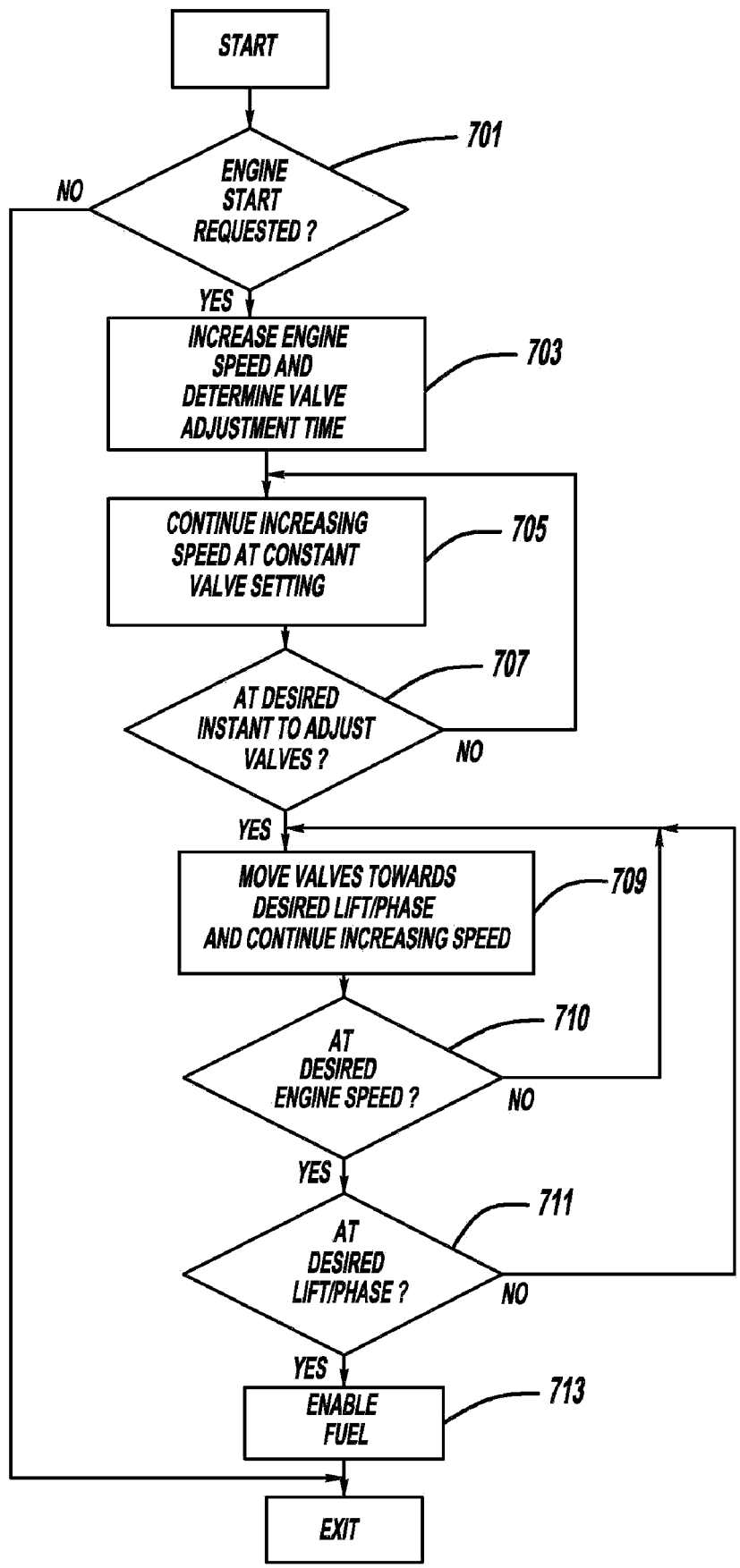
FIG. 7 is a flow chart of an example starting sequence for a variable event valvetrain engine.

Referring to FIG. 7, an example flow chart of an engine starting sequence for an engine having a variable event valvetrain is shown.

After an engine is stopped, oxygen flow to a catalyst can alter the catalyst chemical or physical state so that engine emissions may increase during a subsequent restart. That is, it can be possible to stop an engine when catalyst chemistry may be favorable to converting hydrocarbons, carbon monoxide, and oxides of nitrogen. However, allowing the amount of oxygen stored in the catalyst to increase during an engine stop period or during the starting can reduce the catalyst NOx conversion efficiency since oxygen flow to a catalyst can reduce catalyst temperature and since stored oxygen may be preferentially used to oxidize hydrocarbons and carbon monoxide. Consequently, NOx may pass through the catalyst without being reduced because potential reduction sites may be occupied by oxygen that may have been pumped through the engine. The method of FIG. 7 may reduce engine emissions by reducing the amount of oxygen pumped through an engine during a start.

Continuing with FIG. 7, in step 701, the routine determines if a request to start the engine has been made. If there has been no request to start the engine the routine can exit. The routine of FIG. 7 can also be repeatedly executed at predetermined times or in response to an engine or controller operating event so that valve adjustments may be readily made. If there is a request to start the engine the routine proceeds to step 703.

During this step the valves may also be commanded to an initial position, a low lift and/or a predetermined valve phase where flow through the cylinder may be reduced when the engine rotates, if desired. However, valves may be held in a low flow position (e.g., closing all valves, closing intake valves, or closing exhaust valves) while the engine is stopped to further reduce oxygen flow to a catalyst.

In step 703, the routine increases engine speed and determines when to begin adjusting valve lift and/or phase. In one example, the electric motor of a hybrid vehicle uses at least a portion of the electric motor power to rotate an internal combustion engine. The engine speed can be ramped up to a desired speed in a linear manner, if desired.

The valve adjustment timing schedule can be resolved by subtracting the time for the valve actuator to move from an initial position to a desired position, vev_$\Delta T$, from the time to accelerate the engine from stop to a desired speed, $\Delta T$. That is, the valve adjustment starting time can be expressed by the following equation:

$$T\_strt\_vlv = \Delta T - vev\_\Delta T$$

FIG. 4 can be used to illustrate this method of valve actuator control. The starting sequence begins at the time represented by vertical line $T_4$ and the engine reaches a desired speed at time $T_7$. This is the time $\Delta T$. The time to move the valve actuator to a desired position is the time between $T_5$ and $T_7$, vev_$\Delta T$, and may be a function of engine oil temperature and/or battery voltage, for example. The engine rotates from $T_4$ to $T_5$ before the valve actuator begins to move to the desired position. In this way, the air flow through the engine during an engine start may be reduced since the valves may be commanded to a low flow position while the engine speed is increasing and cylinders may be pumping air through the engine. The routine continues to step 705.

It is also possible to adjust exhaust valve lift/phase during a start so that air pumped through an engine may be reduced. For example, exhaust valve lift may be initially set to a zero or low lift position and then increased as engine speed increases. By reducing exhaust valve lift at low or zero engine speed, less air may be pumped into the exhaust manifold for at least a portion of the starting interval. As engine speed increases, and as engine position is determined, exhaust valve lift may be increased so that combusted gases may be expelled into the exhaust system. This method may be more beneficial after a longer engine off period than after a shorter engine off period since fewer exhaust residuals may be trapped within the cylinder.

In step 705, engine speed continues to increase and the variable event valvetrain may be held at a constant actuator position. That is, the valve may be held at a minimum or flow reducing position. This method can allow the engine to reach a desired speed with reduced cylinder flow. The routine proceeds to step 707.

In step 707, a decision can be made to begin adjusting the variable event valve actuator. If the valve starting time has been exceeded the routine proceeds to step 709. If not, the routine returns to step 705.

In step 709, the variable event valvetrain may be adjusted while engine speed is being increased. Cylinder air flow may be increased by adjusting the valve lift amount and/or the valve phase. The adjustment may be at a constant or variable rate depending on objectives. Furthermore, the adjustment rate may be based on time (e.g., milli-meters per second) or engine speed. Alternatively, the valve lift and/or phase may be adjusted to produce a desired cylinder or engine torque or to induct a desired cylinder air charge by the method described in FIG. 6. The routine proceeds to step 710.

In step 710, a decision can be made to continue valvetrain adjustment or to proceed to step 711 based on engine speed. If the engine speed is below a predetermined desired amount the routine returns to step 709. If the engine speed is above a predetermined amount the routine continues to step 711.

In step 711, a decision can be made to continue valvetrain adjustment or to proceed to step 713. If the variable event valvetrain is at a desired position the routine proceeds to step 713. If not, the routine returns to step 709.

Note: steps 710 and 711 may be combined into a single step that allows the routine to proceed to step 711 if both the engine speed is at a desired level and if the variable event valvetrain is at a desired lift amount or phase. If not, the routine would return to step 709.

In step 713, cylinder fuel can be enabled and the variable event valvetrain can be held in position. By delaying fuel until a desired amount of cylinder air flow may be present, misfires may be reduced. Further, delaying valve adjustment until the engine is at a desired speed can reduce the air pumped to a catalyst and may improve engine emissions during the restart.

Cylinder spark can also be reactivated in step 713 so that the injected fuel can be combusted. The routine proceeds to exit.

In an alternate example, a valve adjustment timing schedule illustrated by FIG. 5 may be used. In this example, the engine can be rotated by a starter motor that may be capable of rotating the engine at lower speeds, 300 RPM or less for example.

The starting sequence begins at $T_4$ and the engine is at a desired speed at $T_7$. The time to adjust the valve actuator is shown between time $T_5$ and time $T_7$. In this example, the valve actuator does not begin to adjust the valve lift and/or phase until location $T_5$. The delay time between $T_4$ and $T_5$ may be related to the time that it can take to synchronize the engine controller to the engine position and/or the delay time may be a function of engine oil temperature and/or battery voltage, engine friction, engine speed, and/or another engine related variable. As mentioned above, air flow through the engine during an engine start may be reduced since the valve may be commanded to a reduced flow position.

In yet another embodiment, the valve adjustment may begin coincident or delayed from initial engine rotation by a predetermined amount of time. When the valve actuator reaches a position that can support a desired level of combustion stability and/or a cylinder inducts a desired air amount, the fuel may be enabled.

The method of FIG. 7 may also be extended to include throttle control. In particular, an electronic throttle may be held closed or at a fixed position at a start until engine position is determined and/or until a predetermined valve lift amount may be achieved.

Figure 8:
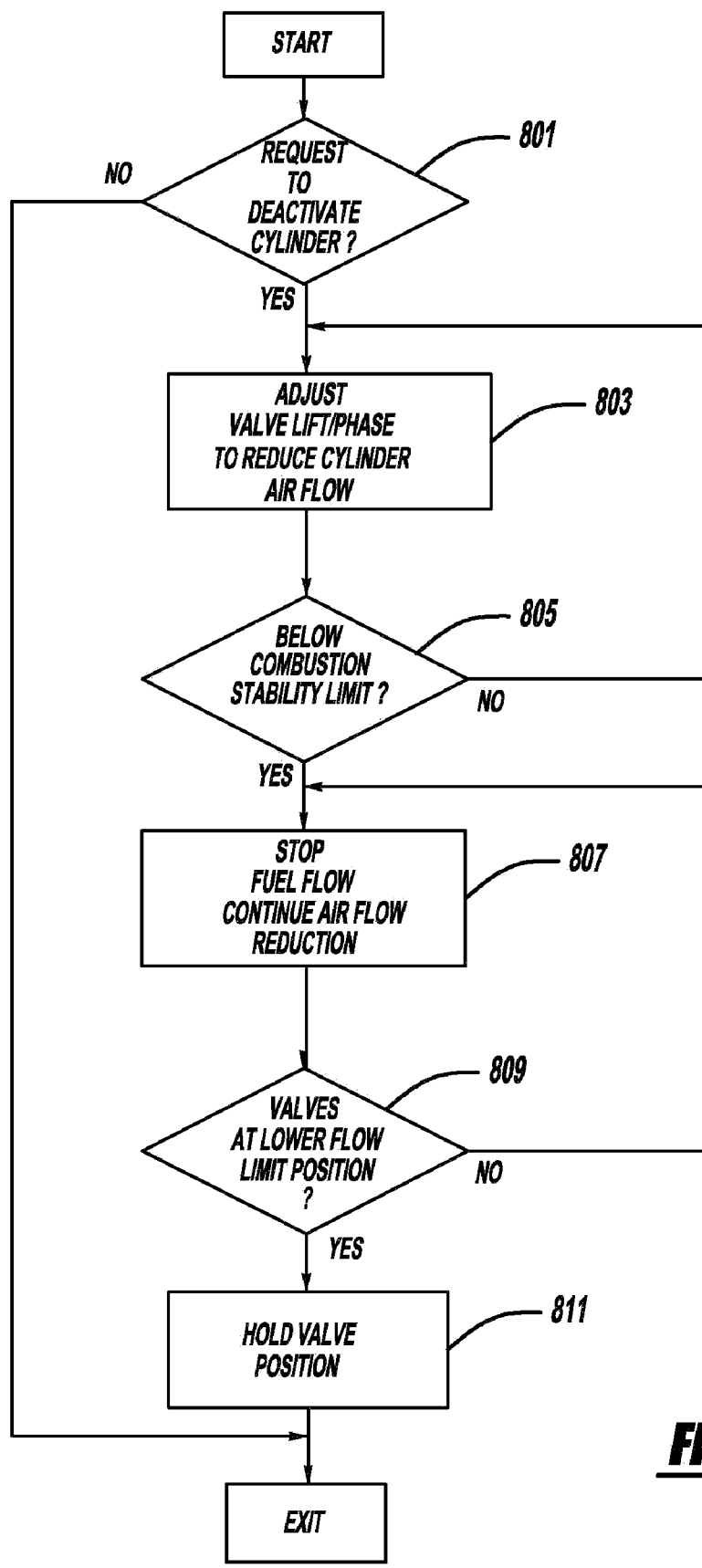
FIG. 8 is a flow chart of an example cylinder deactivation sequence for a variable event valvetrain engine.

Referring to FIG. 8, a flow chart of an example method to deactivate a cylinder is shown. This method may be used when an engine transitions from a first number of operating cylinders to a second number of operating cylinders, said second number of cylinders less than said first number of cylinders.

In step 801, the routine determines if a request to deactivate a cylinder has been made. The deactivation request may be based on engine operating conditions or the request may come from a hybrid vehicle controller, for example. If a request has been made the routine proceeds to step 803. If not, the routine can exit. The routine of FIG. 8 can also be repeatedly executed at predetermined times or in response to an engine or controller operating event so that valve adjustments may be readily made.

In step 803, the variable event valvetrain is adjusted so that air flow through the cylinder may be reduced. The adjustment may reduce valve lift or alter the valve timing with respect to a crankshaft position. Furthermore, the adjustment rate may be a constant, varied based on engine operating conditions, or based on a predetermined torque or cylinder air charge rate of reduction. The routine proceeds to step 805.

In step 805, the routine decides whether to continue adjusting the valvetrain or to proceed to the next step. If the valve lift and/or phase has limited the cylinder air flow below the amount necessary for a desired level of combustion stability the routine proceeds to step 807. If cylinder air flow is above the amount necessary for a desired level of combustion stability the routine returns to step 803.

In step 807, fuel flow is stopped and the valvetrain may continue to be adjusted. By stopping fuel flow to a cylinder when cylinder air flow may be below an amount that may be necessary to maintain a desired level of combustion stability, misfires may be reduced. Furthermore, by continuing to reduce the valve lift and/or change the phase, air flow through the cylinder may be reduced and may lower the amount of oxygen that may be pumped to a catalyst during cylinder deactivation.

Spark may also be deactivated in step 807, preferably after the latest air-fuel mixture is combusted. Spark may be deactivated immediately after combusting the latest injected fuel or it may be deactivated after a predetermined number of cylinder cycles. The routine proceeds to step 809.

In step 809, a decision is made to continue adjusting the valve actuator or to move to step 811. After fuel flow is stopped to a cylinder the valve actuator may need additional time before reaching a low flow position and/or additional commands may be issued by engine controller 12 so that the valve actuator reaches a low flow position. If the valve actuator has not reached a low flow position the routine returns to step 807. If the valve actuator has reached the low flow position the routine continues to step 811.

Note: The above-mentioned low flow valve actuator position does not necessarily have to be a minimum flow position. The low flow position may be some fractional amount of the total available flow range. Furthermore, the low flow position may vary with engine operating conditions, for example.

In step 811, the valve actuator can be held in the low flow position. The valve actuator may be commanded to a fixed position after fuel flow and air flow have been reduced to the cylinder. Alternatively, the valve actuator may be held in position by a mechanical or electromechanical device. By holding the valve actuator at a low flow position catalyst temperature and conversion efficiency may be maintained since fresh air flow through the engine may be reduced. The valve actuator may remain in the low flow position until the cylinder reactivation sequence begins or until a change in cylinder air amount may be desired. The routine proceeds to exit.

The method of FIGS. 6 and 8 may also be extended to include throttle control. Specifically, it may be desirable to control an electronic throttle such that the throttle can be closed after a request to stop an engine. By closing the throttle it may be possible to reduce the engine stop time since the air charge for desired combustion stability may be achieved sooner.

In the methods described by FIGS. 6-8 it may be desirable to adjust throttle 125 to further reduce cylinder air flow. The throttle opening position may be gradually reduced or closed in a single step or in a number of steps after a request to stop the engine or reduce cylinder air flow has been issued. Also, the throttle and valve adjustment rates may be modified in response to barometric pressure and/or humidity, for example.

As will be appreciated by one of ordinary skill in the art, the routines described in FIGS. 6-8 may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features, and advantages described herein, but is provided for ease of illustration and description. Although not explicitly illustrated, one of ordinary skill in the art will recognize that one or more of the illustrated steps or functions may be repeatedly performed depending on the particular strategy being used.

This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The invention claimed is:

1. A method to start an engine having a cylinder, comprising:
   increasing engine RPM during a start from a stopped position after a request to start said engine;
   increasing a peak cylinder valve lift toward a desired amount during said start while said engine RPM is increasing; and
   only enabling fuel flow to said cylinder when said peak valve lift reaches a predetermined level yet continuing to increase peak valve lift toward the desired amount.

2. The method of claim 1 wherein said engine is at least one power source in a hybrid vehicle, the method further comprising, before the start:
   reducing cylinder valve lift in response to a request to stop said engine; and
   stopping fuel flow to said cylinder when said reduced valve lift reduces the cylinder air charge below a threshold.

3. The method of claim 1 wherein a starter motor increases said engine RPM.

4. The method of claim 1 further comprising delivering fuel to said cylinder only when said engine RPM reaches a predetermined level.

5. The method of claim 1 further comprising delivering spark to said engine in response to an engine operating condition.

6. The method of claim 1 wherein the peak valve lift of said cylinder begins from a minimum lift position.

7. A method to start an engine having a cylinder, comprising:
   increasing engine RPM from a stopped position after a request to start said engine;
   ramping a cylinder intake valve opening from a first timing to a desired timing while said engine RPM is increasing during the engine start; and
   enabling fuel flow to said cylinder when a desired cylinder air flow is achieved while continuing to ramp intake valve opening timing toward the desired timing.

8. A method to start an engine having a variable valve lift, comprising:
   increasing engine RPM from a stopped position after a request to start said engine to a predetermined RPM, while fuel flow is stopped to said engine and while a peak cylinder intake valve lift is at a first peak intake valve lift amount;
   increasing said peak cylinder intake valve lift from said first amount to a second amount, during or after the time said engine RPM reaches said predetermined RPM; and
   enabling fuel flow when a desired cylinder air flow is achieved while continuing to increase peak cylinder intake valve lift toward the second amount.

* * * * *